United States Patent
Call et al.

(10) Patent No.: US 10,231,110 B1
(45) Date of Patent: *Mar. 12, 2019

(54) CRASH DETECTION AND SEVERITY CLASSIFICATION SYSTEM IMPLEMENTING EMERGENCY ASSISTANCE

(71) Applicant: STATE FARM MUTUAL AUTOMOBILE INSURANCE COMPANY, Bloomington, IL (US)

(72) Inventors: Shawn M. Call, Bloomington, IL (US); Michael Shawn Jacob, Le Roy, IL (US); Scott T. Christensen, Salem, OR (US); Jackie O. Jordan, II, Bloomington, IL (US); Gregory D. Carter, Bloomington, IL (US); Shawn C. Bennett, Le Roy, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,777

(22) Filed: Feb. 13, 2018

Related U.S. Application Data

(63) Continuation of application No. 15/241,367, filed on Aug. 19, 2016, now Pat. No. 9,949,104, which is a
(Continued)

(51) Int. Cl.
*H04W 4/90* (2018.01)
*G07C 5/00* (2006.01)
(Continued)

(52) U.S. Cl.
CPC .............. *H04W 4/90* (2018.02); *G07C 5/008* (2013.01); *G08G 1/205* (2013.01); *H04W 4/021* (2013.01); *H04W 4/40* (2018.02)

(58) Field of Classification Search
CPC .......... G08G 1/205; H04W 4/90; H04W 4/40; H04W 4/021; G07C 5/008
(Continued)

(56) References Cited

U.S. PATENT DOCUMENTS

| 5,933,080 A * | 8/1999 | Nojima ................ G08B 25/016 340/3.3 |
| 6,076,028 A * | 6/2000 | Donnelly .............. B60R 21/013 701/45 |

(Continued)

*Primary Examiner* — Jack K Wang

(57) ABSTRACT

A crash detection system is disclosed that utilizes a mobile computing device to detect a vehicular accident via one or more sensors integrated into the mobile computing device. The system monitors the sensor metrics measured by one or more sensors and generates an event sensor profile that may include the plurality of sensor metrics and additional status data, such as an indication of whether the mobile computing device was located within a vehicle when the event occurred. By comparing the plurality of sensor metrics to other crash sensor metrics, a determination may be made whether the event requires emergency assistance, which may be confirmed by determining whether the data included in the event sensor profile meets one or more exception conditions. If the event requires emergency assistance and an exception condition is not met, the mobile computing device may place a call to the appropriate emergency response personnel.

20 Claims, 4 Drawing Sheets

Related U.S. Application Data continuation of application No. 14/713,330, filed on May 15, 2015, now Pat. No. 9,449,495.

(51) Int. Cl.
  *G08G 1/00* (2006.01)
  *H04W 4/40* (2018.01)
  *H04W 4/021* (2018.01)

(58) Field of Classification Search
  USPC .................. 340/436, 989; 455/404.1, 404.2
  See application file for complete search history.

(56) References Cited

U.S. PATENT DOCUMENTS

| | | | |
|---|---|---|---|
| 6,618,657 B1 * | 9/2003 | Geil | G08G 1/205 |
| | | | 340/436 |
| 6,678,612 B1 * | 1/2004 | Khawam | G08B 25/016 |
| | | | 340/426.15 |
| 7,508,298 B2 * | 3/2009 | Pisz | G08B 25/001 |
| | | | 340/436 |
| 7,688,203 B2 * | 3/2010 | Rockefeller | B60R 25/102 |
| | | | 340/541 |
| 8,344,913 B2 | 1/2013 | Rieth et al. | |
| 8,620,256 B2 * | 12/2013 | Stahlin | G08B 25/012 |
| | | | 455/404.1 |
| 9,449,495 B1 | 9/2016 | Call et al. | |
| 9,852,553 B2 * | 12/2017 | Choi | G07C 5/08 |
| 2002/0037707 A1 | 3/2002 | Yoshioka et al. | |
| 2004/0153356 A1 | 8/2004 | Lockwood et al. | |
| 2006/0084463 A1 * | 4/2006 | Yoo | H04M 1/72536 |
| | | | 455/550.1 |
| 2007/0167147 A1 * | 7/2007 | Krasner | G08B 25/009 |
| | | | 455/404.2 |
| 2009/0099732 A1 | 4/2009 | Pisz | |
| 2009/0209225 A1 | 8/2009 | Sakai et al. | |
| 2009/0215466 A1 | 8/2009 | Ahl et al. | |
| 2011/0096912 A1 | 4/2011 | Stahlin et al. | |
| 2012/0108198 A1 * | 5/2012 | Edge | H04W 76/50 |
| | | | 455/404.2 |
| 2014/0278572 A1 | 9/2014 | Mullen et al. | |
| 2015/0158447 A1 | 6/2015 | Nonaka | |
| 2015/0163832 A1 | 6/2015 | Hosey et al. | |
| 2015/0172894 A1 | 6/2015 | Gabel | |
| 2015/0178852 A1 | 6/2015 | Mullen et al. | |

\* cited by examiner

CRASH DETECTION AND SEVERITY CLASSIFICATION SYSTEM IMPLEMENTING EMERGENCY ASSISTANCE

CROSS-REFERENCE TO RELATED APPLICATIONS

This application is a continuation of U.S. patent application Ser. No. 15/241,367, filed on Aug. 19, 2016, which is a continuation of U.S. patent application Ser. No. 14/713,330, filed on May 15, 2015, the disclosure of each of which is incorporated herein by reference in its entirety.

TECHNICAL FIELD

The present disclosure relates to methods, apparatus, systems, and non-transitory computer-readable media for detecting vehicular accidents and, more particularly, to detecting a vehicular accident and automatically contacting emergency services via a mobile computing device.

BACKGROUND

In today's automotive industry, vehicle crash detection systems may include proprietary systems that utilize a limited set of sensors and/or specifically designed crash indicators. Traditional accident-detection systems may use these sensors to measure the movement and/or direction of the vehicle during an accident, whether airbags have been deployed, etc.

Vehicle manufacturers may use these accident-detection systems to detect whether an accident has occurred and to contact a call center notifying them of the occurrence of the accident. Call center staff may then attempt to contact the driver and check his condition by placing a call to the vehicle and/or contact emergency response personnel to do so.

However, accident-detection systems add to the cost and complexity of the vehicles in which they are implemented. Additionally, not all vehicles are equipped with such systems, and many drivers are not willing to pay the ongoing costs associated with maintaining such services, which are typically subscription based.

Therefore, accident-detection systems that are not integrated within the vehicle but still detect vehicle accidents and notify emergency services once detected are useful but present several challenges.

SUMMARY OF THE DISCLOSURE

Various embodiments are disclosed for detecting and classifying the occurrence of events while a person is inside of a vehicle. By utilizing one or more sensors integrated into one or more mobile computing devices associated with one or more persons riding in the vehicle, sensor data measured by the one or more mobile computing devices may indicate a location and/or movement of the vehicle. Using the sensor data, the one or more mobile computing devices may determine whether the vehicle in which it is located was involved in an accident.

Because some exceptions may exist regarding whether the occurrence of an event qualifies as one that requires emergency assistance, additional processing may be utilized to eliminate these exceptions, which helps prevent initiating a call for non-emergency events. If the event does qualify as an event requiring emergency assistance, the mobile computing device may initiate a call to relevant parties to request assistance.

In one embodiment, a method is disclosed for (1) monitoring a plurality of sensor metrics associated with an occurrence of an event; (2) monitoring status data indicative of whether the mobile computing device is located within a vehicle during the occurrence of the event; (3) generating an event sensor profile including the plurality of sensor metrics and the status data; (4) determining whether the event requires emergency assistance based upon the event sensor profile; and (5) initiating a call from the mobile computing device to an emergency response service when the event requires emergency assistance.

In another embodiment, a non-transitory, tangible computer-readable medium is disclosed that stores machine readable instructions in mobile computing device, that when executed by a processor, causes the processor to (1) monitor a plurality of sensor metrics associated with an occurrence of an event; (2) monitor status data indicative of whether the mobile computing device is located within a vehicle during the occurrence of the event; (3) generate an event sensor profile including the plurality of sensor metrics and the status data; (4) determine whether the event requires emergency assistance based upon the event sensor profile; and (5) initiate a call from the mobile computing device to an emergency response service when the event requires emergency assistance.

In yet another embodiment, a mobile computing device is disclosed that includes a processor and a communication unit, the processor being configured to (1) monitor a plurality of sensor metrics associated with an occurrence of an event; (2) monitor status data indicative of whether the mobile computing device is located within a vehicle during the occurrence of the event; (3) generate an event sensor profile including the plurality of sensor metrics and the status data; (4) determine whether the event requires emergency assistance based upon the event sensor profile; and (5) initiate a call from the mobile computing device to an emergency response service when the event requires emergency assistance.

BRIEF DESCRIPTION OF THE DRAWINGS

The figures described below depict various embodiments of the systems and methods disclosed herein. It should be understood that each figure depicts an embodiment of a particular embodiment of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The following description discusses the indication and collection of data regarding one or more driving events. Driving events may be determined based on data collected via one or more sensors on a mobile computing device during a driving session or while the vehicle is stationary. As further discussed below, a driving event may be any event that is relevant for the purpose of determining whether a vehicular accident has occurred.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
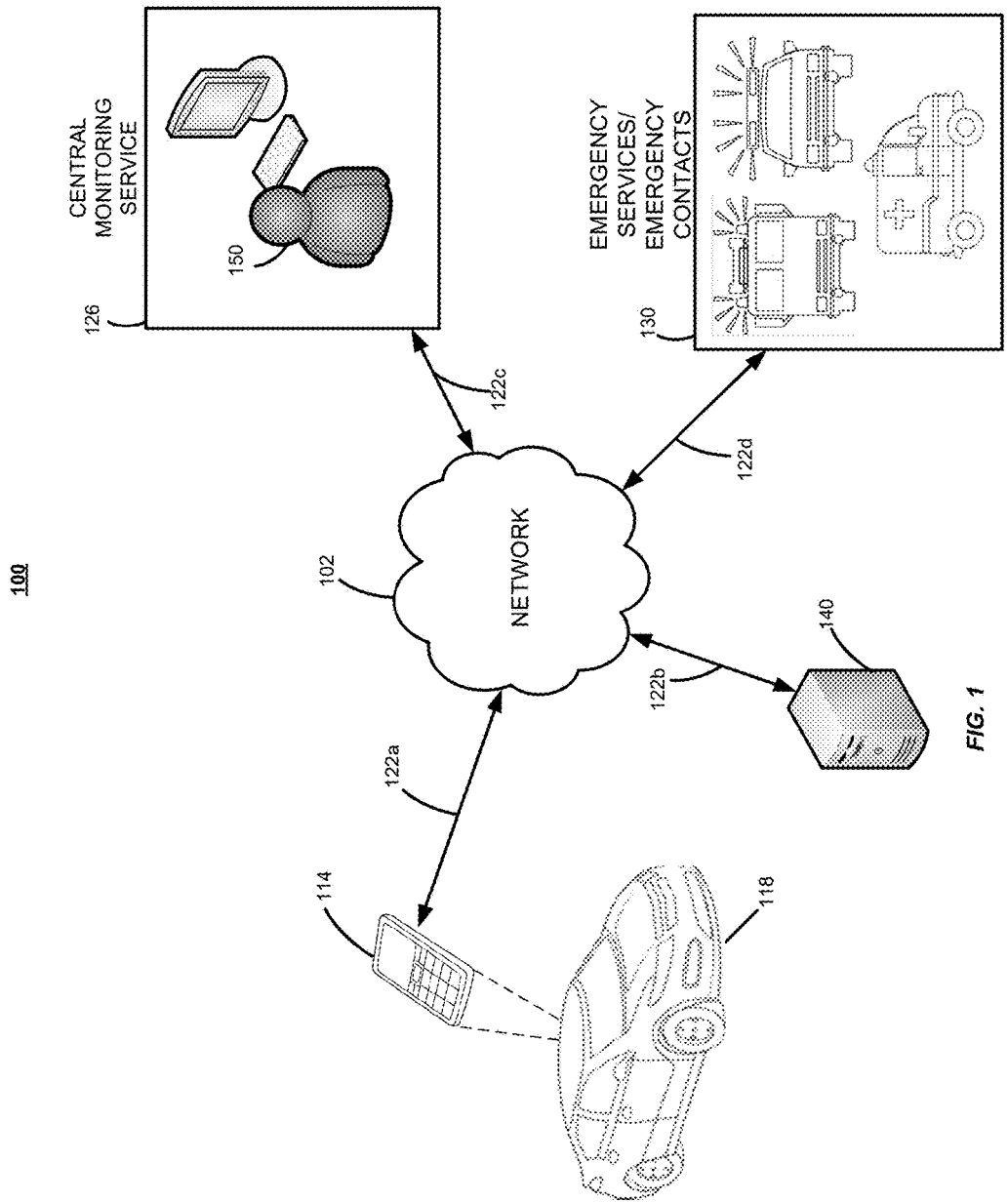
FIG. 1 illustrates a block diagram of a crash detection system 100 in accordance with an exemplary embodiment of the present disclosure.

FIG. 1 illustrates a block diagram of a crash detection system 100 in accordance with an exemplary embodiment of the present disclosure. Crash detection system 100 may include hardware and/or software applications, as well as various data communication channels for facilitating data communications between the various hardware and software components. In an embodiment, crash detection system 100 may include a network 102, a mobile computing device 114, a vehicle 118, a central monitoring service (CMS) 126, emergency services/emergency contacts 130, and an external computing device 140.

Although crash detection system 100 is shown in FIG. 1 as including one network 102, one mobile computing device 114, one vehicle 118, one CMS 126, one emergency services/emergency contacts 130, and one external computing device 140, various embodiments include crash detection system 100 implementing any suitable number of networks 102, mobile computing devices 114, vehicles 118, CMSs 126, emergency services/emergency contacts 130, and external computing devices 140. For example, crash detection system 100 may include a plurality of external computing devices 140 and mobile computing devices 114, any suitable number of which being interconnected via network 102.

In various embodiments, one or more mobile computing devices 114 may be permanently or removably installed in vehicle 118 (e.g. a car, truck, etc.). Although FIG. 1 illustrates vehicle 118 as an automobile, various embodiments include device 114 being permanently or removably installed in any suitable type of vehicle, such as an automobile, a watercraft, an aircraft, a motorcycle, a bicycle, etc.

Mobile computing device 114 may be configured to communicate with one or more of vehicle 118, CMS 126, emergency services/emergency contacts 130, and/or external computing device 140 via one or more suitable communication protocols, which may be the same communication protocols or different communication protocols as one another. For example, mobile computing device 114 may communicate with vehicle 118 via a BLUETOOTH communication protocol while communicating with one or more of CMS 126, emergency services/emergency contacts 130, and/or external computing device 140 via a cellular communication protocol.

Mobile computing device 114 may be configured to execute one or more algorithms, programs, applications, etc., to monitor one or more event sensor metrics, to determine whether an event has occurred that requires emergency assistance from emergency services/emergency contacts 130, and to communicate with CMS 126, emergency services/emergency contacts 130, and/or external computing device 140 via network 102 utilizing one or more links 122a-d. In various embodiments, mobile computing device 114 may be implemented as any suitable type of computing device configured to perform these functions, such as a smartphone, a tablet computer, a laptop computer, a wearable computing device, etc.

In some embodiments, mobile computing device 114 may store data used in conjunction with crash detection system 100 locally, such as collected event sensor metrics, threshold metric values, a location of mobile computing device 114, data used in conjunction with exception conditions, phone numbers to place initiated calls, etc. In other embodiments, mobile computing device 114 may store data used in conjunction with crash detection system 100 externally to external computing device 140 via network 140 (e.g., using links 122a and 122b). In still other embodiments, mobile computing device 114 may store some or all of the data used in conjunction with crash detection system 100 as a combination of locally stored and externally stored data.

In some embodiments, mobile computing device 114 may be configured as a "stand-alone" system, collecting one or more event sensor metrics and determining whether to initiate a call to CMS 126 and/or emergency services/emergency contacts 130 by processing data locally. In other embodiments, mobile computing device 114 may be configured to share and/or outsource any suitable portion of processing used in the embodiments as described herein with one or more other computing devices, such as external computing device 140, for example. Mobile computing device may utilize a thin-client device configuration or any other suitable type of configuration when outsourcing processing.

Mobile computing device 114 may be configured to store the one or more event sensor metrics as an event sensor profile and/or to compare the one or more event sensor metrics to one or more crash sensor metric values to determine whether an event qualifies as one potentially requiring emergency services from emergency services/emergency contacts 130.

Additionally or alternatively, mobile computing device 114 may be configured to store status data as part of the event sensor profile, such as a location of the mobile computing device 114, a time of day, an indication of whether mobile computing device 114 is located in vehicle 118, insurance policy information such as a policy holder's name, a policy number, etc. In this way, the event sensor profile may include data to facilitate the identification and association of the event sensor profile with mobile computing device 114. For example, the event sensor profile may be stored in external computing device 140 corresponding to a phone number associated with mobile computing device 114 so that data stored as part of the event sensor profile may be later identified by this phone number.

As further discussed below, embodiments include mobile computing device 114 making a determination of whether the event qualifies as one potentially requiring emergency services based upon whether the event sensor metrics exceed one or more corresponding crash sensor metric values as well as the event sensor metrics and/or the status data not causing the event to qualify for an exception condition.

If the event qualifies as one potentially requiring emergency services from emergency services/emergency contacts 130 and does not meet an exception condition, embodiments include mobile computing device 114 initiating a call to a one or more of CMS 126 and/or emergency services/ emergency contacts 130. In an embodiment, once the call is initiated, a user may cancel the call from being placed by interacting with mobile computing device 114 within expiration of a time period (e.g., 5 seconds).

Network 102 may be configured as any suitable network that facilitates communications between mobile computing device 114 and one or more of CMS 126, emergency services/emergency contacts 130, and/or external computing device 140. For example, network 102 may include one or more telecommunication networks and may constitute (i) nodes and/or (ii) links used for data and/or communication exchange between various nodes. To provide additional examples, network 102 may include a wireless telephony network (e.g., GSM, CDMA, LTE, etc.), a Wi-Fi network (e.g. based on 802.11x standards), a BLUETOOTH network, one or more proprietary networks, a secure public Internet, a mobile-based network, a virtual private network or some other type of network, such as dedicated access lines, plain ordinary telephone lines, satellite links, a public switched telephone network (PSTN), etc., or any suitable combination thereof.

External computing device 140 may be configured to execute various software applications, algorithms, and/or other suitable programs used to perform one or more functions of crash detection system 100 as described herein. In some embodiments, external computing device 114 may collect and store sensor data used in conjunction with crash detection system 100, as previously discussed.

External computing device 140 may be implemented as any suitable type of device to facilitate these functions. For example, external computing device 140 may be implemented as a network server, a web-server, a database server, one or more databases and/or storage devices, or any suitable combination thereof. One or more portions of external computing device 140 may be implemented as one or more storage devices that are physically co-located with external computing device 140 or may be implemented as a shared database structure (e.g. comprising data storage using cloud computing technology).

In some embodiments, external computing device 140 may be configured to perform any suitable portion of the processing functions remotely that have been outsourced by mobile computing device 114. For example, mobile computing device 114 may collect data (e.g., event sensor metrics, location data, time of day, etc.) as described herein, but mobile computing device 114 may send the collected data to external computing device 140 for remote processing instead of processing the data locally. In such embodiments, external computing device 140 may perform the analysis of the collected data to determine whether an event potentially requires emergency assistance, whether the event qualifies for an exception, and/or may send an indication of this to mobile computing device 114.

CMS 126 may be configured with any suitable number of computing devices, telephones, radio communicators, etc., to communicate with one or more of mobile computing device 114, external computing device 140, and/or emergency services 140 via network 102 utilizing one or more of links 122a, 122b, 122c, and/or 122d. In some embodiments, a call initiated by mobile device 114 in response to an event that requires emergency assistance may be placed to CMS 126. Therefore, CMS 126 may function as a call center and may include one or more persons 150 who receive calls from mobile computing device 114 and/or attempt to communicate with persons in vehicle 118.

It may be valuable for CMS 126 to determine a location of mobile computing device 114 when receiving the call so first responders may be sent to the appropriate location. In some embodiments, when mobile computing device 114 determines that a call is to be placed to CMS 126, mobile computing device 114 may be configured to send any suitable portion of the status data to CMS 126, which may include the location of mobile computing device 114, for example, upon occurrence of the event. This status data may be sent to CMS 126 using any suitable technique. For example, mobile computing device 114 may send one or more portions of the status data to CMS 126 as a short-messaging service (SMS) message, as recorded audio that is initially provided to CMS 126 prior to person 150 being connected, etc.

Regardless of whether a call is placed to CMS 126 and/or emergency services/emergency contacts 130, embodiments include any suitable number and type of status data being sent when the call is placed. The number and type of status data sent may be the same regardless of the entity that is contacted or may vary based upon the entity that is contacted. For example, a call to either CMS 126 and/or emergency services/emergency contacts 130 may result in mobile device 114 sending, as part of the status data, details associated with the severity of the crash (e.g., severity classification details, as further discussed below). To provide another example, a call to CMS 126 may send, as part of the status data, details regarding the user's insurance policy such as policy numbers, a policy holder name, etc., while a call placed to emergency services/emergency contacts 130 may not include such information.

In other embodiments, when mobile computing device 114 determines that a call is to be placed to CMS 126, CMS 126 may access the event sensor profile associated with the phone number of mobile computing device 114 to access any suitable portion of data stored in the event sensor profile that caused the call to be placed. To provide an illustrative example, CMS 126 may identify a number associated with mobile computing device 114 when a call is received from mobile computing device 114. CMS 126 may then access the event sensor profile generated by mobile computing device 114 that caused the call to be placed from external computing device 140 to view, download, etc., status data stored as part of the event sensor profile.

In some embodiments, when mobile computing device 114 determines that an event has occurred requiring emergency assistance, mobile computing device 114 may additionally or alternatively communicate with one or more other computing devices (e.g., external computing device 140) to perform one or more insurance-related processes. For example, mobile computing device 114 may send the user's insurance policy number and/or policy holder information to external computing device 140, which in turn may initiate a claims process by communicating with one or more insurer applications (e.g., via one or more application programming interface (API) service calls). These embodiments may be particularly useful when the severity of the detected crash is classified (as further discussed below) as low, and therefore may not require emergency assistance but still may require repairs. In such a case, mobile computing device 114 may further communicate with external computing device 140 to enable mobile computing device 114 to generate the appropriate notifications to the user, to allow the user to acknowledge the process, and to further facilitate the claim being submitted.

Regardless of how CMS determines the location of mobile computing device 114, CMS 126 may forward this information to emergency services/emergency contacts 130 so that emergency services may be dispatched. In this way, emergency response personnel may be sent to the correct location of vehicle 118 without CMS 126 interacting with potentially injured person.

In various embodiments, CMS 126 may communicate with emergency services/emergency contacts 130 and mobile computing device 114 via network 102 (e.g., via links 122a, 122c, and 122d) concurrently or at different times. For example, CMS 126 may communicate with mobile computing device 114 while contacting emergency services/emergency contacts 130 as part of a three-way conference call. This advantageously provides a person associated with mobile computing device 114 with the added piece of mind of having person 150 on the call while they are trying to contact emergency services/emergency contacts 130.

Emergency services/emergency contacts 130 may be configured with any suitable number of computing devices, telephones, radio communicators, etc., to communicate with one or more of mobile computing device 114, external computing device 140, and/or CMS 126 via network 102 utilizing one or more of links 122a, 122b, 122c, and/or 122d.

Emergency services/emergency contacts 130 may be associated with any suitable number and type of emergency response personnel, such as first responder services, firefighters, ambulance dispatchers, police dispatch, etc. Emergency services/emergency contacts 130 may additionally or alternatively be associated with one or more emergency contacts (e.g., one or more specific friends, family members, etc.) as designated by a user via one or more algorithms, programs, applications, etc., utilized by mobile computing device 114. Upon receiving a call from mobile computing device 114 (either via CMS 126 or directly) emergency services/emergency contacts 130 may attempt to communicate with one or more persons in vehicle 114 to dispatch appropriate personnel to the determined location of vehicle 118.

In some embodiments, a call initiated by mobile device 114 in response to an event that requires emergency assistance may be first placed to CMS 126 via network 102 utilizing links 122a and 122c, who may then relay the location of vehicle 118 and/or other details of the event to emergency services/emergency contacts 130.

In other embodiments, a call initiated by mobile device 114 in response to an event that requires emergency assistance may be placed directly to emergency services/emergency contacts 130 via network 102 utilizing links 122a and 122d. In accordance with such embodiments, CMS 126 may not be necessary. When CMS 126 is not utilized, emergency services/emergency contacts 130 may determine the location of mobile computing device 114 using any suitable techniques upon receiving a call from mobile computing device 114, as previously discussed with reference to CMS 126.

Figure 2:
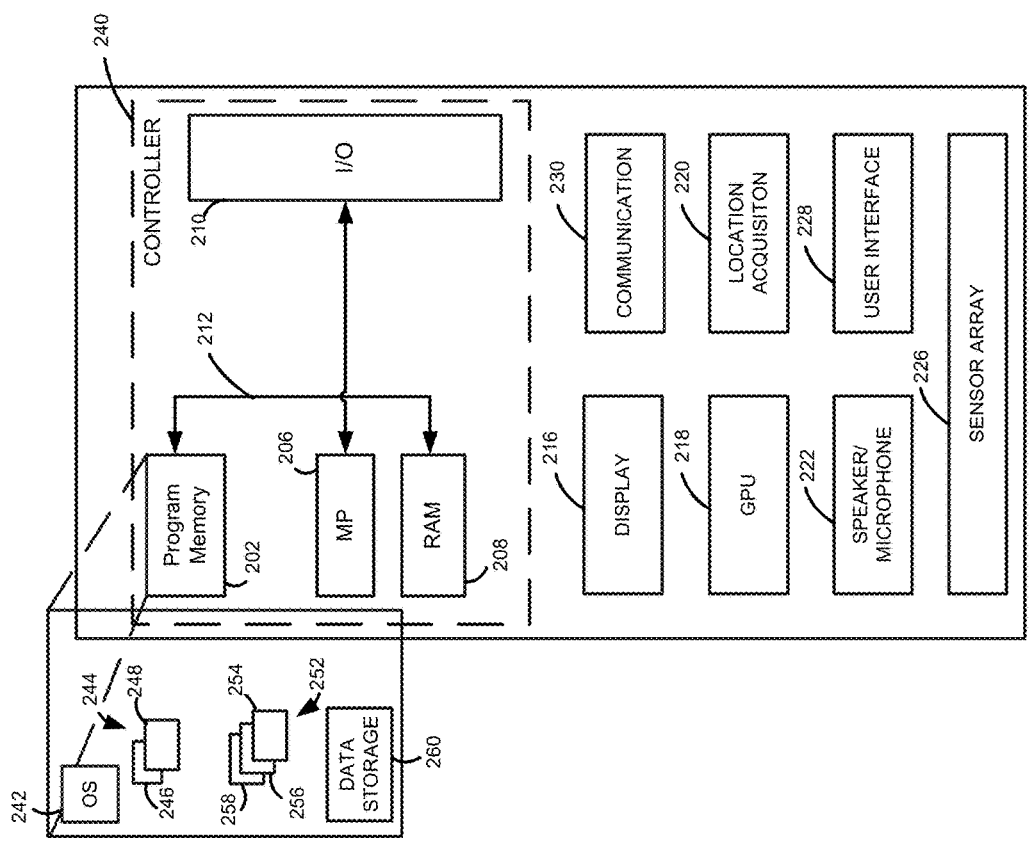
FIG. 2 illustrates a block diagram of a mobile computing device 200 in accordance with an exemplary embodiment of the present disclosure.

FIG. 2 illustrates a block diagram of a mobile computing device 200 in accordance with an exemplary embodiment of the present disclosure. Mobile computing device 200 may include a display 216, a graphics processing unit (GPU) 218, a location acquisition unit 220, a speaker/microphone 222, a sensor array 226, a user interface 228, and a communication unit 230. In an embodiment, mobile computing device 200 may be an implementation of mobile computing device 114, for example, as shown in FIG. 1.

In an embodiment, controller 240 may include a program memory 202, one or more of a microprocessor (MP) 206, a random-access memory (RAM) 208, and an input/output (I/O) interface 210, each of which may be interconnected via an address/data bus 212. In various embodiments, program memory 202 may be implemented as a non-transitory tangible computer readable media configured to store computer-readable instructions, that when executed by controller 240, cause controller 240 to perform various acts.

For example, as shown in FIG. 2, program memory 202 may include an operating system 242, one or more software applications 244, and one or more software routines 252. To provide another example, program memory 202 may include other portions to store data that may be read from and written to by MP 206, such as data storage 260, for example. Although FIG. 2 depicts one program memory 202, one MP 206, and one RAM 208, controller 240 may include any suitable number of program memory 202, MP 206, and RAM 208.

Although FIG. 2 depicts I/O interface 210 as a single block, various embodiments of I/O interface 210 may include any suitable number and/or types of I/O interfaces 210. In various embodiments, controller 240 may implement RAM(s) 208 and program memories 202 as any suitable type of memory, such as non-transitory computer readable memories, semiconductor memories, magnetically readable memories, and/or optically readable memories, for example.

In an embodiment, one or more MPs 206 may be configured to execute any of one or more of software applications 244 and/or software routines 252 residing in program memory 202, in addition to other software applications.

In an embodiment, operating system 242 may be implemented as any suitable operating system platform depending on the particular implementation of mobile computing device 200. For example, operating system 242 may be implemented as one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In an embodiment, data storage 260 may store data used in conjunction with one or more functions performed by mobile computing device 200 to facilitate the interaction between mobile computing device 200 and one or more other devices, such as between mobile computing device 200 and one or more networks (e.g., network 102), external computing devices (e.g., external computing devices 140), vehicles (e.g., vehicle 118), central monitoring services (e.g., CMS 126), emergency services (e.g., emergency services/emergency contacts 130), etc. In some embodiments, controller 240 may be configured to communicate with additional data storage mechanisms that are not shown in FIG. 2 for purposes of brevity (e.g., one or more hard disk drives, optical storage drives, solid state storage devices, etc.) that reside within or are otherwise associated with mobile computing device 200.

In an embodiment, data storage 260 may store data such as application data for the one or more software applications 244, routine data for the one or more software routines 252, event sensor profile data such as measured sensor metrics, threshold crash metric values, exception sensor metric values, location data (which may include multiple locations of mobile computing device 200 measured and stored over time), geofence data, an indication of whether mobile computing device 200 is connected to and/or communicating with a vehicle, a phone number corresponding to mobile computing device 200, etc.

Display 216 may be implemented as any suitable type of display and may facilitate user interaction with mobile computing device 200 in conjunction with user interface 228. For example, display 216 may be implemented as a capacitive touch screen display, a resistive touch screen display, etc. In various embodiments, display 216 may be configured to work in conjunction with controller 240 and/or GPU 218 to display an indication that a call is about to be placed by mobile computing device 200, that one or more applications are running on mobile computing device 200, etc.

Communication unit 230 may be configured to facilitate communications between mobile computing device 200 and one or more other devices, as previously discussed above with reference to FIG. 1. In various embodiments, communication unit 230 may be configured to support any suitable number and type of communication protocols based upon a particular network and/or device in which mobile communication device 200 is communicating.

For example, communication unit 230 may support communications in accordance with a communications protocols such as cellular communication protocols (e.g., GSM, CDMA, LTE), Wi-Fi 802.11 standards, WiMAX, near field communication (NFC) standards (e.g., ISO/IEC 18092, standards provided by the NFC Forum), BLUETOOTH communication protocols, etc.

Communication unit 230 may be configured to support separate or concurrent communications, which may be the same type of communication protocol or different types of communication protocols. For example, communication unit 230 may be configured to facilitate communications between mobile computing device 200 and an external computing device (e.g., external computing device 140) via cellular communications while facilitating communications between mobile computing device 200 and the vehicle in which it is carried (e.g., vehicle 118).

In an embodiment, communication unit 230 may store, as part of status data, an indication of other devices in which mobile computing device 200 is connected to and/or devices in which mobile computing device 200 is communicating. For example, if mobile computing device 200 is paired with a vehicle via a BLUETOOTH communication protocol, then communication unit 230 may store an indication of this in a suitable portion of data storage 260 and/or to another device (e.g., an external computing device such as external computing device 140, as shown in FIG. 1). This indication may include data having any suitable format and/or information indicating the communication status of mobile computing device 230, such as a log of connection times, media access controller (MAC) addresses of the devices in which mobile computing device 200 is connected, a description of the device in which mobile computing device 200 is connected, etc.

In this way, communication unit 230 may log the connection and/or communication status of mobile computing device 200 over a period time and store this information as status data with the event sensor profile corresponding to one or more events. As will be further discussed below, this connection and/or communication status data may be used to verify whether an event qualifies for an exception condition.

Location acquisition unit 218 may be configured to utilize any suitable communications protocol to facilitate global positioning system functions. For example, location acquisition unit 218 may communicate with one or more satellites and/or wireless transmitters to determine a location of mobile computing device 200. GNSS unit 206 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of mobile computing device 200.

In an embodiment, location acquisition unit 218 may periodically store, as status data, one or more locations of mobile computing device in a suitable portion of data storage 260 and/or to another device (e.g., an external computing device). In this way, location acquisition unit 218 may track the location of mobile computing device 200 over time and store this data as status data with the event sensor profile corresponding to one or more events. As will be further discussed below, this location data may be used to verify whether an event qualifies for an exception condition.

Sensor array 226 may be configured to measure any suitable number and/or type of sensor metrics. Sensor array 226 may be implemented with any suitable number and type of sensors to perform the functions associated with the embodiments described herein. In an embodiment, sensor array 226 may be implemented as one or more sensors positioned to determine the force and/or direction associated with movements of mobile computing device 200. For example, sensor array 226 may include one or more accelerometers, gyroscopes, magnetometers, barometers, thermometers, proximity sensors, light sensors, Hall Effect sensors, etc. In embodiments in which sensor array 226 includes one or more accelerometers, sensor array 226 may be configured to measure and/or collect accelerometer metric values utilizing an X-axis, Y-axis, and Z-axis accelerometer. In accordance with such embodiments, sensor array 226 may measure sensor metric values as a three-dimensional accelerometer vector that represents the movement of mobile computing device 200 in three dimensional space by combining the outputs of the X-axis, Y-axis, and Z-axis accelerometers using any suitable techniques. User-interface 228 may be implemented as any suitable device configured to collect user input, such as a "soft" keyboard that is displayed on the display 216 of mobile computing device 200, a keyboard attached to mobile computing device 200, an external keyboard communicating via a wired or a wireless connection (e.g., a BLUETOOTH keyboard), an external mouse, etc.

In an embodiment, one of the one or more software applications 244 may be a crash detection application 246, which may be implemented as a series of machine-readable instructions for performing the various tasks associated with executing one or more embodiments described herein. In an embodiment, crash detection application 246 may cooperate with one or more other hardware or software portions of mobile computing device 200 to facilitate these functions.

To provide an illustrative example, crash detection application 246 may include instructions for performing tasks such as measuring event sensor metrics, storing the event sensor metrics, measuring and/or storing status data, generating one or more event sensor profiles from the event sensor metrics and/or status data, storing one or more event sensor profiles to a suitable portion of data storage 260 and/or to another device (e.g., an external computing device), determining whether an event corresponding to the event sensor profile qualifies as an event potentially requiring emergency assistance, determining whether the event corresponding to the event sensor profile qualifies for one or more exception conditions, initiating a call upon a determination that an event requires emergency assistance and does not qualify for one or more exception conditions, receiving user input, facilitating communications between mobile computing device 200 and one or more other devices in conjunction with communication unit 230, etc.

One of the one or more software applications 244 may be a web browser 248. In some embodiments, web browser 248 may be a native we browser application, such as Apple's Safari®, Google Android™ mobile web browser, Microsoft Internet Explorer® for Mobile, Opera Mobile™, etc. In other embodiments, web browser 248 may be implemented as an embedded web browser.

Regardless of the implementation of web browser 248, various embodiments include web browser 248 being implemented as a series of machine-readable instructions for receiving, interpreting, and displaying web page information from an external computing device (e.g., external computing device 140). This web page information may be utilized in conjunction with crash detection application 246 to perform one or more function of the embodiments as described herein.

In an embodiment, one of the one or more software routines 252 may include a crash detection routine 254. Crash detection routine 254 may include instructions that are executed by controller 240 to facilitate the monitoring, measurement, collection, quantifying, and/or storage of event sensor metrics measured via sensor array 226 and/or status data generated by one or more of location acquisition unit 220 and/or communication unit 230.

In an embodiment, crash detection routine 254 may include instructions that are executed by controller 240 to determine a vector describing the motion of mobile computing device 200 for use with crash detection application 246. In embodiments in which sensor array 226 implements accelerometers in two or more axes, crash detection and severity classification routine 254 may also combine the data from the two or more accelerometers to establish a vector describing the motion of mobile computing device 200 through three dimensional space, and thus the motion of a respective vehicle.

In an embodiment, crash detection routine 254 may include instructions, that when executed by controller 240, cause controller 240 to determine whether the occurrence of an event may qualify as one requiring emergency assistance, subject to additional conditions as discussed below. In accordance with such an embodiment, crash detection routine 254 may include instructions that facilitate controller 240 comparing a set of event sensor metrics to a set of respective crash sensor metrics to determine whether the event sensor metrics exceed the respective crash sensor metrics.

Because events may have varying durations, various embodiments include the sensor metrics being sampled in accordance with any suitable sampling rate and a comparison being made between the event sensor metrics and the crash sensor metrics over any suitable time interval. For example, the event sensor metrics may be sampled every millisecond, every 10 milliseconds, etc. Furthermore, once the sampled event sensor metrics are quantified and stored, the comparison between the stored event sensor metrics and the crash sensor metrics may be made over any number of sampling periods.

In an embodiment, an event may be deemed as potentially requiring emergency assistance when the event sensor metrics exceeds respective crash sensor metrics for a duration of time corresponding to the number of sampling periods over which the comparisons are made. In this way, transient sensor measurements that may result in event sensor metrics exceeding crash sensor metrics for only a small period of time (e.g., 1 millisecond) may not result in an event qualifying as one potentially requiring emergency assistance.

The sampling rate, magnitude of the crash sensor metrics, and/or duration of time over which the comparisons are made may be adjusted based upon considerations such as desired accuracy, the particular implementation of mobile computing device 200, tradeoffs between sampling rate and power consumption of mobile computing device 200, etc.

To provide an illustrative example, execution of crash detection routine 254 may cause controller 240 to store accelerometer data measured by sensor array 226 as event sensor metrics every T milliseconds as part of an event sensor profile. The event sensor metrics may be stored, for example, as combined vector movement values or as individual axis accelerometer values. During a single sampling period within the event sensor profile, therefore, event sensor metrics may be measured in the x, y, and z-axes resulting in a combined accelerometer movement through three dimensional space of A1 m/s$^2$.

Furthermore, a crash sensor metric may correspond to X1 m/s$^2$, with lesser values known to be consistent with events that do not correspond to a vehicular accident. A typical crash may be known to result in excessive g-forces being exerted on passengers for impulses between approximately t1 to t2 milliseconds. Therefore, controller 240 may determine that the event associated with the event sensor profile qualifies as one potentially requiring emergency assistance, subject to additional conditions as discussed below, if event sensor metrics within the event sensor profile have values of A1>X1 over a duration of time exceeding t1 milliseconds.

To provide another illustrative example, a crash sensor metric may correspond to barometric pressure, which may be sampled by one or more barometers implemented as part of sensor array 226, for example. Upon deployment of an airbag within a vehicle, the pressure within the cabin of the vehicle will increase for a brief period of time. That is, when changes in cabin pressure are sampled over time, an airbag deployment may result in a characteristic pressure "pulse." Therefore, controller 240 may determine that the event associated with the event sensor profile qualifies as one potentially requiring emergency assistance, subject to additional conditions as discussed below, if event sensor metrics within the event sensor profile indicate changes in pressure over time substantially matching a predetermined pressure pulse shape. This determination may be made, for example, by comparing the sampled barometric pressure points over a time window and determining whether the amplitude, time, and/or shape of the pressure pulse matches a known airbag deployment pressure profile within a certain threshold.

Because an airbag deployment may be extremely brief in nature (e.g., on the order of 200 milliseconds or less) aspects include sensor array 226 sampling barometric pressure at sufficiently high rates (e.g., 10-20 Hz) to ensure these changes are captured and stored as part of the event sensor profile.

In an embodiment, one of the one or more software routines 252 may include a severity classification routine 256. Severity classification routine 256 may include instructions that are executed by controller 240 to facilitate classifying an event that qualifies as potentially requiring emergency assistance, subject to additional conditions as discussed below.

As previously discussed with regards to crash detection routine 254, controller 240 may determine that an event associated with an event sensor profile qualifies as potentially requiring emergency assistance when one or more event sensor metrics included in the event sensor profile exceeds one or more threshold crash sensor metrics. In an embodiment, severity classification routine 256 may further classify the severity of such an event by, for example, comparing the one or more event sensor metrics to additional classifying threshold sensor metrics.

In some embodiment, controller 240 may determine that an event associated with an event sensor profile qualifies as potentially requiring emergency assistance based upon a combination of one or more sensor metrics that constitute an event sensor profile. For example, some event sensor metrics may be more reliable indicator that a crash has occurred than others. In such a case, controller 240 may examine a plurality of sensor metrics using a multi-threshold approach.

To provide an illustrative example, an event sensor profile may include pressure sensor metrics and accelerometer sensor metrics. In the case of an airbag deployment when the vehicle windows and sunroof are open, the resulting airbag pressure pulse may not be as distinct as the case when the vehicle windows are all closed. As a result, even though an airbag deployment may be detected, the reduced pulse shape may provide less reliability in determining whether the an airbag has been deployed or some other pressure anomaly had occurred. Therefore, embodiments, include controller 240 comparing the pressure sensor metrics over a window of time to a plurality of threshold pressure severity thresholds, such that increasing threshold values indicate more severe pressure pulses.

If the pressure sensor metrics indicate that a lower severity threshold is surpassed but not a greater one, then controller 240 may use a tiered approach to ascertain a better indication of whether the event sensor profile qualifies as potentially requiring emergency assistance. Continuing this example, upon a detection of a "weak" pressure pulse (e.g., one exceeding a first, lower pressure threshold value but not a second, higher pressure threshold value) controller 240 may proceed to examine additional sensor metrics (e.g., accelerometer metrics) that constitute the same event sensor profile to determine whether their values constitute a higher level of crash severity.

If so, controller 240 may determine that an airbag has deployed and that the event sensor profile qualifies as potentially requiring emergency assistance. If not, then controller 240 may determine that the weak pressure pulse was due to something else, and therefore the event sensor profile does not qualify as potentially requiring emergency assistance. In an embodiment, severity classification routine 256 may additionally or alternatively classify the severity of such an event by assigning any suitable number of thresholds having any suitable values in such a manner such that sensor metrics may be appropriately weighted based upon their respective reliability in determining whether the event sensor profile qualifies as potentially requiring emergency assistance.

Classifications may be based on any suitable range of threshold values. To provide an illustrative example, the base threshold crash sensor metric may be represented by an acceleration metric value of $X1$ m/s$^2$, while severity classification routine 256 may include additional classifying threshold sensor metrics $Y1$ m/s$^2$ and $Z1$ m/s$^2$. $Y1$ m/s$^2$ may be selected such that it exceeds $X1$ m/s$^2$, while $Z1$ m/s$^2$ may be selected such that it exceeds both $X1$ m/s$^2$ and $Y1$ m/s$^2$. Although two classifying threshold sensor metrics are used in this example, embodiments include crash detection routine 256 implementing any suitable number of classifying threshold sensor metrics.

In an embodiment, once controller 240 determines that an event may qualify as potentially requiring emergency assistance, controller 240 may further execute instructions stored in severity classification routine 256 to classify the severity of the event based upon the number of classifying threshold sensor metrics that are exceeded by the event sensor metrics. Using the example above, if $A1$ m/s$^2$ exceeds both $X1$ m/s$^2$ and $Y1$ m/s$^2$, then controller 240 may assign a "moderate" classification to the event. To continue this example, if $A1$ m/s$^2$ exceeds only $X1$ m/s$^2$, then controller 240 may assign a "light" classification to the event. To further continue this example, if $A1$ m/s$^2$ exceeds $X1$ m/s$^2$, $Y1$ m/s$^2$, and $Z1$ m/s$^2$, then controller 240 may assign a "severe" classification to the event.

In some embodiments, although the event may qualify as one potentially requiring emergency assistance, mobile computing device 200 may only initiate a call when an event has been classified in excess of a particular threshold classification. These embodiments may be particularly useful when additional customization or control is desired regarding the nature of the event that may result in a call being placed.

In other embodiments, the number called may be dependent upon the classification of the event. For example, mobile computing device 200 may initiate a call to a CMS 126 for events classified as light and moderate, but may initiate a call directly to emergency services (e.g., E-911) for events classified as severe. In this way, mobile computing device 200 may ensure that emergency assistance is requested in the most efficient way based upon the severity of the crash detected.

In yet additional embodiments, classification of the severity of the event may not be utilized. In accordance with such embodiments, calls may be initiated from mobile computing device 200 based upon the determination made via execution of crash detection routine 254, and thus severity classification routine 254 may not be needed in accordance with such embodiments.

Mobile computing device 200 may be subjected to one or more events that are unrelated to a vehicle crash but nonetheless still generate one or more event sensor metrics that produce similar sensor metrics as a vehicle crash. Therefore, in an embodiment, one or more of software routines 252 may include an exception routine 258. Exception routine 258 may include instructions that are executed by controller 240 to facilitate the verification of whether an event that qualifies as potentially requiring emergency assistance actually results in a call being initiated from mobile computing device 200.

For example, instructions stored in exception routine 258 may facilitate the comparison of one or more event sensor metrics within an event sensor profile to one or more respective exception sensor metrics and/or the determination of whether mobile computing device 200 was located in a vehicle when the event occurred. In various embodiments, exception routine 258 may include instructions to facilitate any suitable number of these exceptions and/or conditions being verified.

In various embodiments, any suitable number of exceptions may be modeled using a variety of exception sensor metrics based upon the various desired exceptions that are anticipated. To provide an illustrative example, a person may drop mobile computing device 200 while they are inside or outside of a vehicle. In such a case, exception sensor metrics may include accelerometer metrics for each of the x, y, and z-axes that indicate acceleration substantially in only the z-axis. By comparing the one or more event sensor metrics to the exception sensor metrics in such a manner, a determination may be made whether the one or more event sensor metrics match the exception metrics within a threshold tolerance. If so, then an event that was determined as potentially requiring emergency assistance may be dismissed as meeting this exception condition.

Furthermore, a person may take mobile computing device 200 on amusement park rides, thrill rides, etc., that may produce similar event sensor metrics as a vehicle crash. Therefore, in various embodiments, any suitable number of geofences may be used to determine whether the event meets an exception condition, i.e., whether mobile computing device 200 is located within one or more geofences associated with locations of amusement parks, theme parks, etc.

As previously discussed, the event qualifying as potentially requiring emergency assistance may include an event sensor profile having status data such as a location of mobile computing device when the event occurred. Therefore, using the location of mobile computing device stored as part of the status data, controller 240 may compare this location to one or more geofences to determine whether mobile computing device 200 was at a location within the geofences when the event occurred. If so, then an event that was determined as potentially requiring emergency assistance may be dismissed as meeting this exception condition.

Still further, mobile computing device 200 may be subjected to one or more actions while outside of a vehicle that may produce similar event sensor metrics as a vehicle crash. Therefore, in various embodiments, an indication of whether mobile computing device 200 was located in a vehicle at the time of the event may be used as another exception condition. In some embodiments, this information may also be used as a trigger to launch and/or execute crash detection application 246, such that events are monitored once mobile computing device 200 enters a vehicle. In other embodiments, this information may be used as an exception condition while mobile computing device 200 otherwise monitors such events.

To provide another illustrative example, as previously discussed, the event qualifying as potentially requiring emergency assistance may include an event sensor profile having status data that indicates whether mobile computing device 200 is connected and/or communicating with a vehicle (e.g., via a paired BLUETOOTH connection). In an embodiment, instructions stored in exception routine 258 may facilitate the determination of whether mobile computing device 200 was located in a vehicle when the event occurred. If not, then an event that was determined as potentially requiring emergency assistance may be dismissed as meeting this exception condition.

To provide another illustrative example, as previously discussed, the event qualifying as potentially requiring emergency assistance may include an event sensor profile having status data that indicates mobile computing device 200's tracked location data. In an embodiment, instructions stored in exception routine 258 may facilitate the determination of whether mobile computing device 200 was moving in excess of a threshold speed that was maintained for a threshold time period when the event occurred. That is, the tracking data may enable controller 260 to determine a velocity of mobile computing device 200 (e.g., via timestamps, sampling rate, etc.) and whether mobile computing device has maintained this velocity for a threshold period of time. This threshold velocity may be chosen as a value that would likely ensure that mobile computing device 200 was in a vehicle (e.g., 15 mph, 25 mph, etc). Likewise, the threshold period of time may be chosen to help ensure that transient conditions do not generate false conditions (e.g., 20 mph for 5 seconds, for 10 seconds, etc.). If mobile computing device 200 was determined to not me moving in such a manner when the event occurred, then an event that was determined as potentially requiring emergency assistance may be dismissed as meeting this exception condition.

Once an event has been determined as potentially qualifying for emergency assistance and an exception condition is not found, crash detection application 246 may cause mobile computing device 200 to initiate a call to the appropriate party. As will be further discussed below with reference to FIG. 3, a person may cancel this call within a certain period of time to further control the number of calls placed and to ensure that those placed are necessary. In various embodiments, crash detection application 246 may cause mobile computing device 200 to store one or more contact numbers used to place the call upon detection of an event requiring emergency assistance.

In some embodiments, this contact may include a default emergency services number (e.g., E-911) based upon the user's location and/or operative cellular network used to place the call. But in other embodiments, these contacts may be customized and/or preprogrammed into mobile computing device 200 by a user, such as via user interface 228, for example. In accordance with embodiments utilizing one or more customizable contacts, a user may specify a list of contacts in lieu of or in addition to those specified for emergency services. For example, a user may specify that, when an event is detected requiring emergency assistance, mobile computing device 200 first contact E-911 services and, when this call is terminated, to contact a family member, friend, etc., from contacts stored or otherwise associated with mobile computing device 200.

To provide another example, a user may specify that, when an event is detected requiring emergency assistance, mobile computing device 200 contact a friend, family member, etc. as an alternative to contacting emergency services. Further continuing this example, a user may specify a customized prioritized list of any suitable number of contacts in this way. Mobile computing device 200 may place a call to a contact associated with the highest priority and, if the highest priority contact call is not answered or the call otherwise ends before a threshold time period elapses, subsequent attempts may be made according to the priority order that has been specified by the user.

In some embodiments, one or more of software applications 244 and/or software routines 252 may reside in program memory 202 as default applications that may be bundled together with the OS of mobile computing device 200. For example, web browser 248 may be part of software applications 244 that are included with OS 242 implemented by device 200.

In other embodiments, one or more of software applications 244 and/or software routines 252 may be installed on mobile computing device 200 as one or more downloads, such as an executable package installation file downloaded from a suitable application store via a connection to the Internet. For example, crash detection application 246, crash detection routine 254, severity classification routine 256, and/or exception routine 258 may be stored to suitable portions of program memory 202 upon installation of a package file downloaded in such a manner. Examples of package download files may include downloads via the iTunes store, the Google Play Store, the Windows Phone Store, downloading a package installation file from another computing device, etc. Once downloaded, crash detection application 246 may be installed on device 200 as part of an installation package such that, upon installation of crash detection application 246 on mobile computing device 200, crash detection routine 254, severity classification routine 256, and/or exception routine 258 may also be installed.

Figure 3:
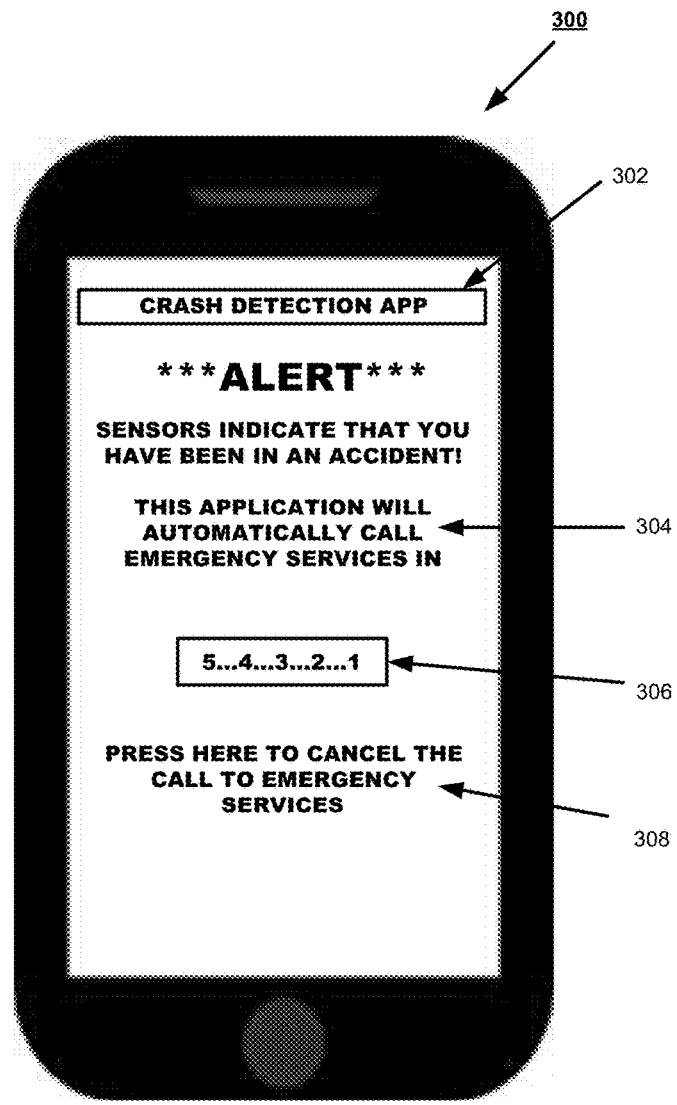
FIG. 3 illustrates an example of a screenshot 300 displayed by a mobile computing device in accordance with an exemplary embodiment of the present disclosure.

FIG. 3 illustrates an example of a screenshot 300 displayed by a mobile computing device in accordance with an exemplary embodiment of the present disclosure. Screenshot 300 includes portions 302, 304, 306, and 308.

In the present embodiments, the screenshot shown in FIG. 3 is an example of what may be displayed to a user once a client application (e.g., crash detection application 246) is launched or otherwise executed on a mobile computing device in accordance with the various embodiments as describe herein. In the present embodiments, screenshot 300 may be displayed using any suitable interface device, such as display 216, for example, as shown in FIG. 2. As will be appreciated by those of ordinary skill in the relevant art(s), the example screenshot shown in FIG. 3 is for illustrative purposes, and the described functions may be implemented using any suitable format and/or design without departing from the spirit and scope of the present disclosure.

Portion 302 may include any suitable graphic, information, label, prompt, etc., to indicate the client application is currently running. In some embodiments, portion 302 may be omitted.

Portion 304 may include any suitable graphic, information, label, prompt, etc., to indicate that a crash has been detected and that a call will be placed to the appropriate parties. For example, as shown in FIG. 3, a message may include relevant text "alert," "sensors indicate that you have been in an accident!," "this application will automatically call emergency services in:," etc. Although not shown in FIG. 3 for purposes of brevity, portion 304 may include any suitable effects to enhance, emphasize, etc., portion 304 (or the entire screen), e.g., flashing, changing colors, etc.

As shown in FIG. 3, portion 306 may include any suitable graphic, information, label, prompt, etc., to display a timer via display 216. As shown in FIG. 3, the display timer may include a numerical indicator to allow the user a period of time in which to respond before the mobile computing device automatically initiates the call.

As shown in FIG. 3, portion 308 may include any suitable graphic, information, label, prompt, etc., to display a message that provides the user with instructions on how to cancel the call from being placed.

In an embodiment, portion 308 may be implemented as an interactive portion of the display, such that a user may select portion 308 using an appropriate gesture, such as tapping the portion 308 with the user's finger, etc. If a user elects to cancel the call, he may respond within the time period as indicated in portion 306 prior to expiration of the timer. Upon selecting portion 308, the call may be cancelled. In an embodiment, user interface 228 may receive the gesture as an input, controller 240 may process the received input in conjunction with exception routine 258, and the call may be canceled.

If the user does not elect to cancel the call, then the mobile computing device will initiate the call upon expiration of the timer. Although 5 seconds is shown in FIG. 3 for illustrative purposes, any suitable time period may be selected to provide a user with a suitable period of time in which to cancel the call (e.g., 3 seconds, 10 seconds, etc.).

Figure 4:
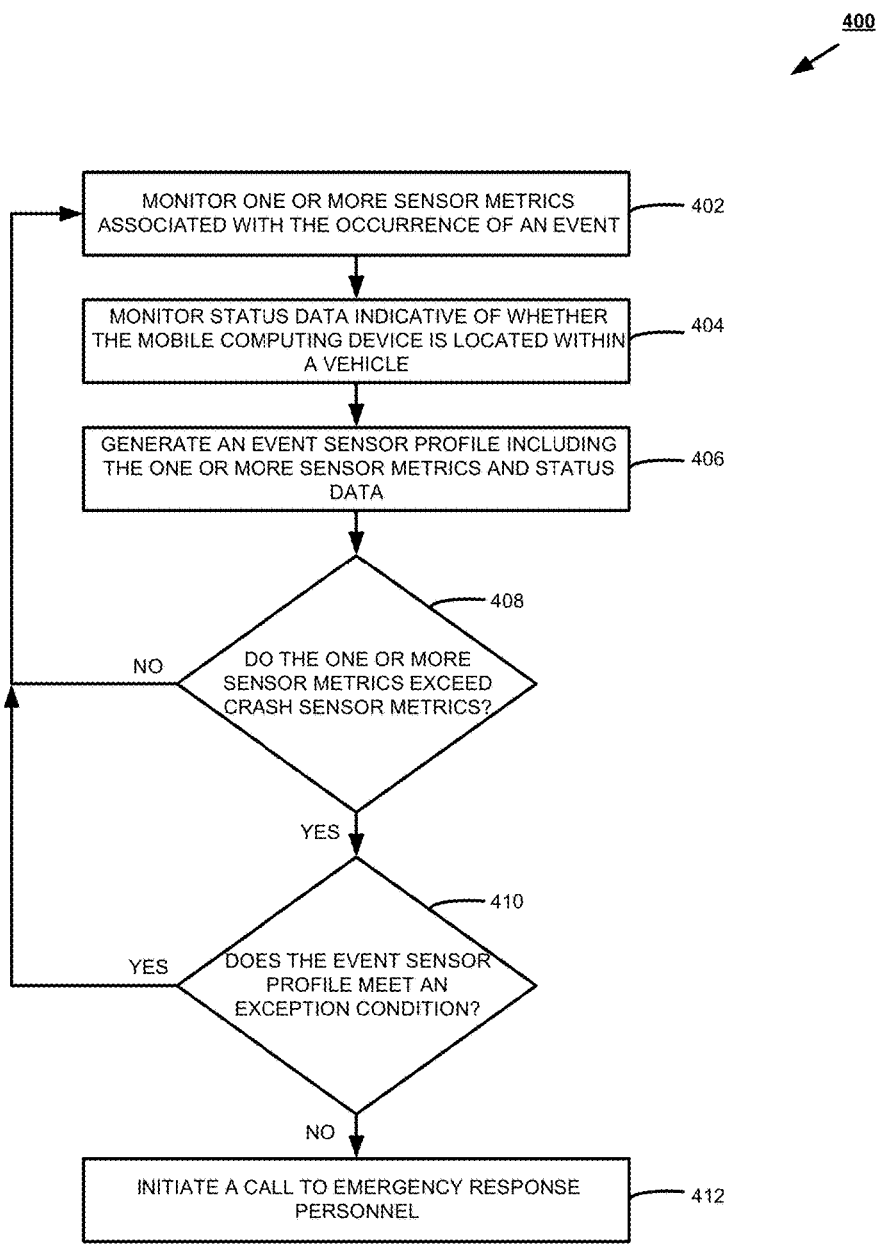
FIG. 4 illustrates an example method 400 in accordance with an exemplary embodiment of the present disclosure.

FIG. 4 illustrates an example method 400 in accordance with an exemplary embodiment of the present disclosure. In the present embodiment, method 400 may be implemented by any suitable device, such as mobile computing device 114 and/or mobile computing device 200 as shown in FIGS. 1 and 2, respectively, for example. In an embodiment, method 400 may be performed by one or more processors, applications, and/or routines, such as any suitable portion of controller 240, software applications 244, and/or software routines 252, for example, as shown in FIG. 2.

Method 400 may start when one or more processors monitors one or more sensor metrics associated with an occurrence of an event (block 402). The one or more sensor metrics may include for example, accelerometer data measured in one or more axes. The monitoring may include sampling the one or more sensor metrics at a sampling rate (block 402) such that the one or more sensor metrics are measured and/or stored over one or more sampling points in accordance with the sampling rate (block 402).

Method 400 may include one or more processors monitoring status data indicative of whether the mobile computing device is located within a vehicle during the occurrence of the event (block 404). The status data may include, for example, data indicative of whether the mobile computing device in which method 400 is performed (e.g., mobile computing device 200) 200 is connected to and/or communicating with a vehicle, a location of the mobile computing device, a plurality of locations of the mobile computing device logged over a period time, etc. (block 404).

Method 400 may include one or more processors generating an event sensor profile including the plurality of sensor metrics and the status data (block 406). This may include, for example, a mobile computing device (e.g., mobile computing device 200) storing an event sensor profile including one or more sampled event sensor metrics and/or status data in a suitable memory location (e.g., data storage 260, external computing device 140, etc.) (block 406).

Method 400 may include one or more processors determining whether the one or more sensor metrics exceed respective crash sensor metric values (block 408). This determination may be made, for example, by comparing any suitable number or type of sampled sensor metrics to one or more crash sensor metric values. For example, any suitable number of sampled combined accelerometer motion data or sampled individual accelerometer axis data over any duration may be compared to the crash sensor metric values (block 408).

If the one or more sensor metrics do not exceed the respective crash sensor metric values, then the event does not correspond to one requiring emergency assistance (block 408) and method 400 reverts to continue monitoring one or more sensor metrics associated with an occurrence of an event (block 402).

However, if the one or more sensor metrics do exceed the respective crash sensor metric values, then the event potentially corresponds to one requiring emergency assistance (block 408) and method 400 continues (block 410).

Method 400 may include one or more processors determining whether the event that was found as potentially requiring emergency assistance (block 408) meets one or more exception conditions (block 410). This determination may be made, for example, by comparing the one or more sensor metrics to one or more exception sensor metrics to determine whether the mobile computing device in which method 400 is performed was dropped or otherwise not involved in a vehicular accident (block 410).

This determination may be made, for example, utilizing one or more portions of the status data (block 410) previously stored (block 404). For example, if the status data indicates that the mobile computing device in which method 400 is performed (e.g., mobile computing device 200) was not located inside of a vehicle when the event occurred or that the mobile computing device was located in a geofenced area corresponding to an exception condition, then the event sensor profile would meet these exception conditions (block 410).

If the event sensor profile indicates that an exception has been met (block 410), then the event does not correspond to one requiring emergency assistance and method 400 reverts to continue monitoring one or more sensor metrics associated with an occurrence of an event (block 402).

However, if the event sensor profile indicates that an exception has not been met (block 410), then the event does correspond to one requiring emergency assistance and method 400 continues (block 412).

Method 400 includes initiating a call from a mobile computing device to the appropriate emergency response personnel (block 412). This could include, for example, a call being placed to a central monitoring service (e.g., CMS 126) and/or emergency services (e.g., emergency services/emergency contacts 130).

This detailed description is to be construed as exemplary only and does not describe every possible embodiment, as describing every possible embodiment would be impractical, if not impossible. One may be implement numerous alternate embodiments, using either current technology or technology developed after the filing date of this application.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities.

Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers.

What is claimed:

1. A computer-implemented method for placing an emergency call from a portable computing device upon detecting an event requiring emergency assistance, comprising:
    detecting, by one or more processors of the portable computing device, that an event has occurred based upon an analysis of data stored in an event sensor profile;
    determining, by one or more processors of the portable computing device, whether the event is one requiring emergency assistance when sensor metrics included in the stored event sensor profile match those associated with a vehicle crash and the stored event sensor profile further indicates that the portable computing device was located within a vehicle when the event occurred; and
    when it is determined that the event corresponds to one requiring emergency assistance, initiating, by one or more processors of the portable computing device, a call to an emergency response service.

2. The method of claim 1, wherein the event sensor profile further includes status data that is generated by the portable computing device and indicates one or more of:

a status of communications between the vehicle and the portable computing device;
a velocity of the portable computing device; and
a location of the portable computing device.

3. The method of claim 1, wherein the sensor metrics indicate pressure measurements, and
wherein the determination of whether the event is one requiring emergency assistance is made based upon the pressure measurements matching a pressure pulse shape associated with airbag deployment.

4. The method of claim 1, wherein the sensor metrics indicate pressure measurements and acceleration measurements, and
wherein the determination of whether the event is one requiring emergency assistance is made based upon a combination of the pressure measurements and the acceleration measurements.

5. The method of claim 1, wherein a determination is made that the event is one requiring emergency assistance only when the sensor metrics indicate that an exception condition has not been satisfied.

6. The method of claim 1, wherein the stored event sensor profile further includes status data that is generated by the portable computing device, and
wherein a determination is made that the event is one requiring emergency assistance only when the status data indicates that an exception condition has not been satisfied.

7. The method of claim 6, wherein the status metrics indicate a location of the portable computing device over time, and
wherein the exception condition is satisfied when the location of the portable computing device at the time the event occurred is within a geofence.

8. A portable computing device configured to initiate a call to an emergency response service upon detecting an event requiring emergency assistance, comprising:
a processor configured to:
detect that an event has occurred based upon analysis of data stored in an event sensor profile;
determine whether the event is one requiring emergency assistance when sensor metrics included in the stored event sensor profile match those associated with a vehicle crash and the stored event sensor profile further indicates that the portable computing device was located within a vehicle when the event occurred; and
a communication unit configured to call an emergency response service when it is determined that the event corresponds to one requiring emergency assistance.

9. The portable computing device of claim 8, wherein the event sensor profile further includes status data that is generated by the portable computing device and indicates one or more of:
a status of communications between the vehicle and the portable computing device;
a velocity of the portable computing device; and
a location of the portable computing device.

10. The portable computing device of claim 8, wherein the sensor metrics indicate pressure measurements, and
wherein the processor is further configured to determine whether the event is one requiring emergency assistance based upon the pressure measurements matching a pressure pulse shape associated with airbag deployment.

11. The portable computing device of claim 8, wherein the sensor metrics indicate pressure measurements and acceleration measurements, and
wherein the processor is further configured to determine whether the event is one requiring emergency assistance based upon a combination of the pressure measurements and the acceleration measurements.

12. The portable computing device of claim 8, wherein the processor is further configured to determine that the event is one requiring emergency assistance only when the sensor metrics indicate that an exception condition has not been satisfied.

13. The portable computing device of claim 8, wherein the stored event sensor profile further includes status data that is generated by the portable computing device, and
wherein the processor is further configured to determine that the event is one requiring emergency assistance only when the status data indicates that an exception condition has not been satisfied.

14. The portable computing device of claim 13, wherein the status metrics indicate a location of the portable computing device over time, and
wherein the exception condition is satisfied when the location of the portable computing device at the time the event occurred is within a geofence.

15. A non-transitory, tangible computer-readable medium storing machine readable instructions in portable computing device, that when executed by a processor of the portable computing device, causes the processor to:
detect that an event has occurred based upon an analysis of data stored in an event sensor profile;
determine whether the event is one requiring emergency assistance when sensor metrics included in the stored event sensor profile match those associated with a vehicle crash and the stored event sensor profile further indicates that the portable computing device was located within a vehicle when the event occurred; and
when it is determined that the event corresponds to one requiring emergency assistance, initiate a call to an emergency response service.

16. The non-transitory, tangible computer-readable medium of claim 15, wherein the event sensor profile further includes status data that is generated by the portable computing device and indicates one or more of:
a status of communications between the vehicle and the portable computing device;
a velocity of the portable computing device; and
a location of the portable computing device.

17. The non-transitory, tangible computer-readable medium of claim 15, wherein the sensor metrics indicate pressure measurements, and
wherein the instructions to determine whether the event requires emergency assistance further include instructions, that when executed by the processor, cause the processor to determine whether the event is one requiring emergency assistance based upon the pressure measurements matching a pressure pulse shape associated with airbag deployment.

18. The non-transitory, tangible computer-readable medium of claim 15, wherein the sensor metrics indicate pressure measurements and acceleration measurements, and
wherein the instructions to determine whether the event requires emergency assistance further include instructions, that when executed by the processor, cause the processor to determine whether the event is one requiring emergency assistance based upon a combination of the pressure measurements and the acceleration measurements.

19. The non-transitory, tangible computer-readable medium of claim 15, wherein the instructions to determine whether the event requires emergency assistance further include instructions, that when executed by the processor, cause the processor to determine that the event is one requiring emergency assistance only when the sensor metrics indicate that an exception condition has not been satisfied.

20. The non-transitory, tangible computer-readable medium of claim 15, wherein the stored event sensor profile further includes status data that is generated by the portable computing device that indicate a location of the portable computing device over time, and
  wherein the instructions to determine whether the event requires emergency assistance further include instructions, that when executed by the processor, cause the processor to determine that the event is one requiring emergency assistance only when the location of the portable computing device at the time the event occurred is not within a geofence.

\* \* \* \* \*